United States Patent [19]

Kirdulis

[11] Patent Number: 5,743,595
[45] Date of Patent: Apr. 28, 1998

[54] ADJUSTABLE SEAT ARM

[75] Inventor: Stanley Raymond Kirdulis, Darlington, Wis.

[73] Assignee: Flexsteel Industries, Inc., Dubuque, Iowa

[21] Appl. No.: 892,425

[22] Filed: Jul. 14, 1997

Related U.S. Application Data

[63] Continuation of Ser. No. 783,620, Jan. 14, 1997, abandoned.

[51] Int. Cl.$^6$ .................................................... A47C 7/54
[52] U.S. Cl. ................................ 297/411.38; 297/411.3
[58] Field of Search ............................ 297/411.2, 411.3, 297/411.32, 411.35, 411.38, 411.39; 248/118, 118.1

[56] References Cited

U.S. PATENT DOCUMENTS

| | | | |
|---|---|---|---|
| 3,116,093 | 12/1963 | Bosack | 297/411.32 |
| 3,993,350 | 11/1976 | McFarlane | 297/411.38 |
| 4,466,664 | 8/1984 | Kondou | 297/411 |
| 4,496,190 | 1/1985 | Barley | 297/411.32 X |
| 4,946,226 | 8/1990 | Hurn et al. | 297/417 |
| 4,978,171 | 12/1990 | Tateyama | 297/417 |
| 5,056,868 | 10/1991 | Beck | 297/417 |
| 5,106,160 | 4/1992 | Nomura et al. | 297/411.32 |
| 5,395,160 | 3/1995 | Krebs et al. | 397/411.2 |
| 5,409,297 | 4/1995 | DeFilippo | 297/411.32 |
| 5,433,509 | 7/1995 | Hotary et al. | 397/411.33 |
| 5,489,143 | 2/1996 | Adachi et al. | 297/411.38 |

FOREIGN PATENT DOCUMENTS

| | | | |
|---|---|---|---|
| 2696387 | 4/1994 | France | 297/411.32 |
| 1163839 | 6/1985 | U.S.S.R. | 297/411.32 |
| 2170099 | 7/1986 | United Kingdom | 297/411.32 |

*Primary Examiner*—Milton Nelson, Jr.
*Attorney, Agent, or Firm*—Lee, Mann, Smith, McWilliams, Sweeney & Ohlson

[57] ABSTRACT

An improved seat arm for a reclinable recreational vehicle seat is adjustable for pitch, or the angle relative to the seat back for a more comfortable horizontal position relative to the floor of the vehicle and has a memory to maintain angle when the arm is flipped back and returned to the near horizontal position.

13 Claims, 3 Drawing Sheets

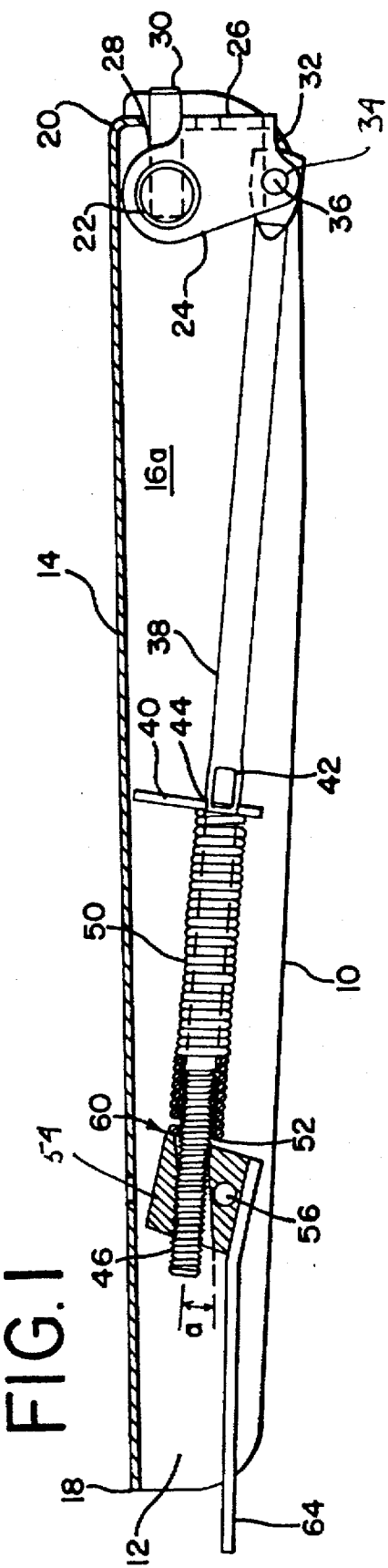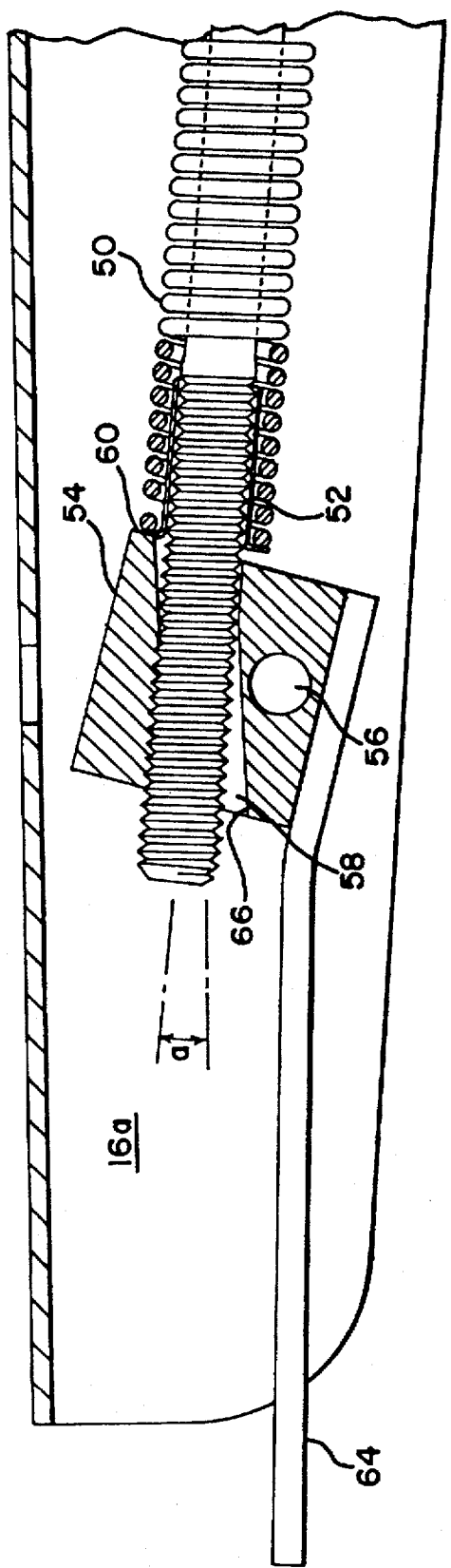

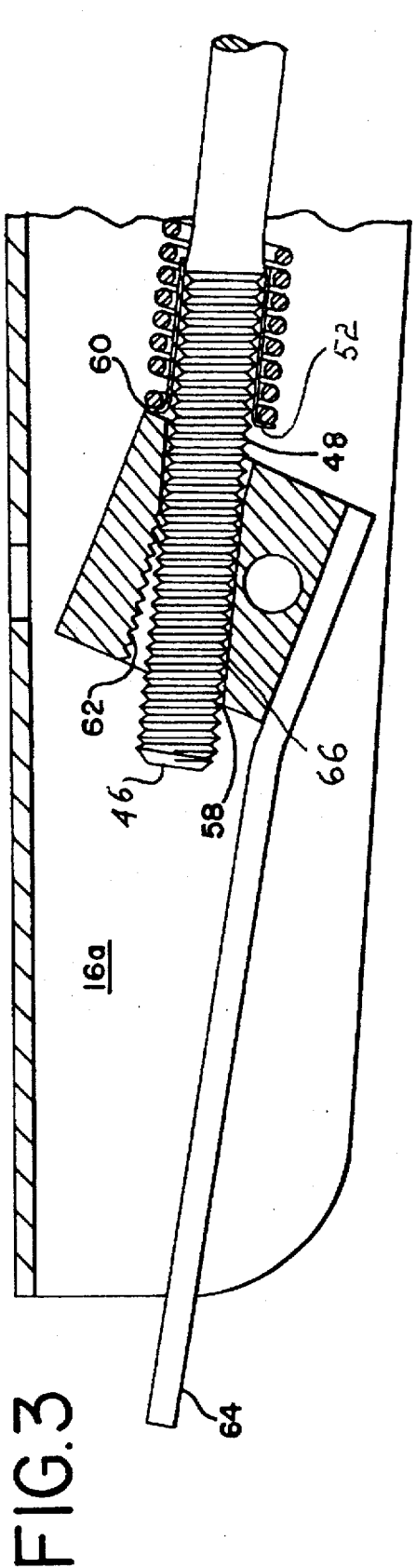
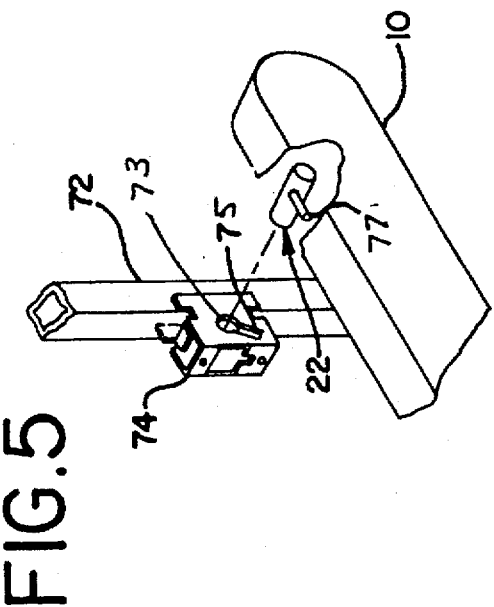
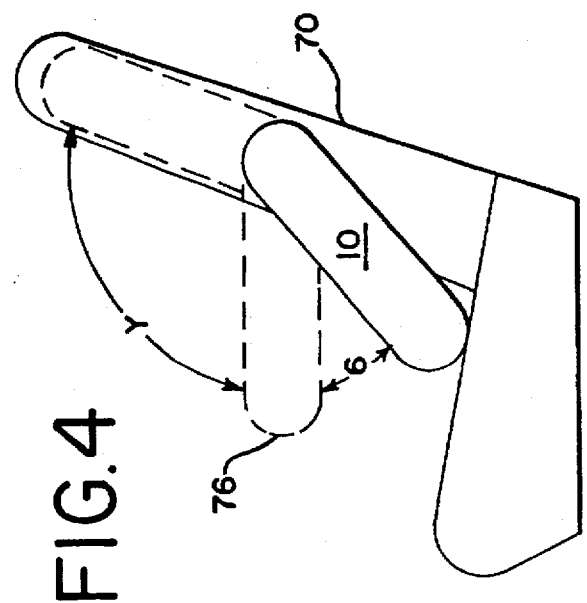

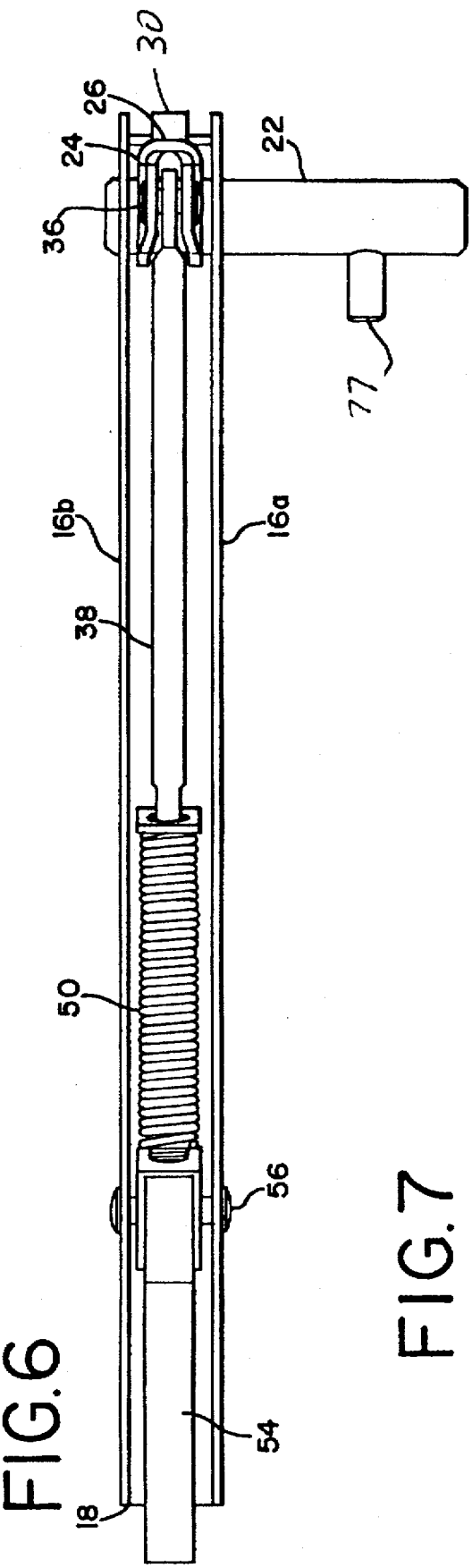

ADJUSTABLE SEAT ARM

This application is a continuation of application Ser. No. 08/783,620, filed Jan. 14, 1997 and now abandoned.

This application claims priority based upon U.S. Provisional Patent Application Ser. No. 60/012,901, filed Mar. 6, 1996.

BACKGROUND OF THE INVENTION

The invention is an improved seat arm for a seat such as an automobile or truck bucket seat or a recreational vehicle seat. Where the seat back on a seat or chair can be reclined, having the arm at a fixed angle relative to the seat back has significant disadvantages in discomfort, inconvenience and obstruction of the cabin or seating area of the vehicle. A seat arm adjustable for pitch, or the angle relative to the seat back may be adjusted to a more comfortable horizontal position relative to the floor of the vehicle.

BRIEF DESCRIPTION OF THE DRAWINGS

The following drawings, in which like reference characters indicate like parts, are illustrative of embodiments of the invention and are not intended to limit the scope of the invention in any manner whatsoever, as encompassed by the claims forming a part hereof.

FIG. 1 is a sectional view of an adjustable seat arm.

FIG. 2 is an enlarged sectional view of an adjustable seat arm in a locked position.

FIG. 3 is an enlarged sectional view of an adjustable seat arm in a released position.

FIG. 4 is a general arrangement view of a seat having an adjustable seat arm.

FIG. 5 is a cutaway perspective view of an adjustable seat arm attachment to a seat frame.

FIG. 6 is a bottom plan view of an adjustable seat arm.

FIG. 7 is a rear elevational view of an adjustable seat arm.

DETAILED DESCRIPTION OF THE PREFERRED EMBODIMENT

An adjustable, pivoting seat arm 10 is provided for pivoting deployment and retraction on a seat back preferably an automobile, truck or recreational vehicle seat. The arm 10 is built up on a generally "U" shaped sheet metal frame 12 having a horizontal web 14 and vertical longitudinally extending flanges 16a and 16b. The term longitudinally refers to the convention of using the arm in a seat such as a bucket seat in a van or truck such that the seat is forward facing along the longitudinal axis of the base vehicle. The arm 10 has a forward end 18 and a rearward end 20. Located near the rearward end 20 is pivot 22 which may be a pin, tube or the like that permits the arm 10 to be raised to a generally vertical position substantially parallel with the seat back for ease of ingress and egress from the vehicle seat and a generally horizonal position deployed for use as an armrest.

With the arm 10 in its generally horizontal position, the position is maintained by housing 24 which is affixed around pivot 22 and has an end wall 26 with a recess or cut out 28 that butts against arm index pin 30. Arm index pin 30 both provides for angle control and vertical positioning stopping. It also provides transverse positioning so that the arm is maintained on pivot 22.

A offset pin supporting portion 32 on housing 24 has an aperture 34 in which control rod pin 36 is retained to provide an anchor point for rod 38. Extending generally longitudinally from pin 36 is control rod 38. Red 38 extends through spring plate 40 in a direction generally toward end 18.

Generally midway from pin 36 rod 38 has a stop 42. In the preferred embodiment stop 42 is provided by flattening rod 38 in two directions with the incumbent deformation of material in directions perpendicular thereto. Other alternatives such as a nut, pin, clip or cotter key could accomplish the function. Stop 42 provides an enlarged surface as rod 38 extends through an aperture 44 in spring plate 40. Spring plate 40 is carried on rod 38, providing an enlarged surface against which spring 50 bears. Spring plate 40 is configured so that its edges follow flanges 16a and 16b as rod 38 moves in an angular manner relative to web 14, as described below.

Opposite pin 36 as rod 38 further extends through spring plate 40 is threaded end 46 of rod 38. Carried on the shank portion between spring plate 40 and end 46 is compression spring 50. It will be noted that a similar operation could be obtained by using an extension spring aligned differently.

Also carried on the threaded portion 48 is eyelet 52. Eyelet 52 protects the threads, provides for a bushing maintaining the perpendicularity of the coils on spring 50 and allows the spring to move freely over threaded portion 48. Locker 54 is mounted on flanges 16a and 16b through transverse pin or rivet 56 in a pivotable manner. Aperture 58 passes entirely through locker 54. Corner 60 of locker 54 bears on the end of spring 50 and is preloaded in normal operation. Locker 54 has a threaded portion 62 in aperture 58 which threaded portion normally bears against threaded end 48 of rod 38.

Locker 54 and its elements described make up a self-energizing mechanism wherein the load increases the locking power making it more secure. Thus, while spring 50 urges the respective threads on threaded portion 62 and threaded end 48 into engagement, load on arm 10 actually increases the load tending to keep those threads in engagement.

Lever 64 enables displacement of locker 54 around pin 56 which disengages threaded portion 62 from rod end 48. This then permits the generally longitudinal movement of locker 54 and pin 56 aligned near end 18, assisted by spring 50. Because of the vertical displacement between pivot 22 and pin 36 at end 20 this generally longitudinal movement results in a change in the horizontal angle of web 14, although housing 24 does not move relative to arm index pin 30. In this manner, an angle adjustment for improved comfort and convenience of the occupant of a vehicle seat is enhanced while the general positioning of the arm is maintained.

The angle alpha represents the offset between the threaded portion 62 and the unthreaded sliding portion 66 of the locker 54. Angle alpha is preferably about eight and possibly has high as twelve degrees. This has been found sufficient to disengage standard threads and permit about a three degree change in the angle gamma between the arm 10 and seat back 70 per thread. Thus the angle gamma can be adjusted in three degree increments, an amount similar in magnitude to the industry standard of two and one half degrees increments for seat back adjustment.

The adjustable seat arm 10 is adapted to be mounted on a seat back 70 and more particularly on the frame 72 of the seat back. Aperture 73 in mounting 74 can be seen in FIG. 5 to have a keyhole configuration. This permits the arm 10 to be mounted on the seat back 70 by aligning so that keyhole index pin 77 passes through slot 75 of aperture 73. This insertion operation is shown in FIG. 4. As the arm 10 is rotated through angle beta to generally horizontal position 76 it is locked in place in mounting 74 by pin 77 under pressure from spring 78 (FIG. 7). Thus adjustable arm 10 is adapted to fit standard seat backs 70 and is therefore adaptable to easy and efficient manufacture, customization, and retrofitting.

The adjustable seat arm as shown and described permits adjustment of from about 5 degrees above the standard arm position to about 30 degrees below the standard arm position taking advantage of seat back 70 reclining arrangement. Nevertheless the entire arm 10 can be retracted to a nearly parallel position relative to seat back 70 preferably over parallel to approximately five degrees back of parallel.

The adjuster maintains position so when the arm is flipped back to the more horizontal position, the angle adjustment is maintained. The "memory" position provides a distinct advantage over prior art devices.

While lever 54 is preferably adjusted by manipulation at the end of the arm, other possibilities exist such as actuation by pressure through an aperture in the upholstery or actuation by squeezing resilient upholstery.

As many and varied modifications of the subject matter of this invention will become apparent to those skilled in the art from the detailed description given hereinabove, it will be understood that the present invention is limited only as provided in the claims appended hereto.

In accordance with the invention, I claim:

1. An improved seat arm for a reclinable vehicle seat having a seat back pivotable relative to a base comprising:

an arm having a length and locatable at an angle from the seat back, said arm having a forward end and a rearward end with a pivot near the rearward end, said pivot providing said arm with angular movement;

said arm having a housing with an end wall having a recess adaptable to receive an arm index pin;

a control rod being pivotally mounted to an anchor point near said rearward end;

said housing further having an offset pin supporting portion with a first aperture, said first aperture receiving a control rod pin;

said control rod pin being operatively connected to said control rod at a pin end;

said control rod extending in a direction generally toward said forward end;

said control rod having a threaded portion at said forward end;

said control rod further having a stop between said ends;

said control rod receiving an eyeletted spring, said spring operatively acting against a spring plate;

a locker for controlling said angular movement of said arm by selectively engaging and releasing said control rod, said locker located at a distance from said control pin;

said locker being pivotally mounted so as to receive said control rod in a second aperture having a threaded portion and a slidable portion, said second aperture further being biased into engagement with said threaded portion of said control rod by action of said spring on said locker;

a lever being operatively connected to said locker to enable manipulation of said locker by pivoting into a disengaged position whereby said control rod passes through said slidable portion of said second aperture;

said locker operative on said control rod to change said distance from said locker to said control rod pin, displacement of said control rod pin and said arm index pin and the relative difference between said locker—rod pin distance and said length of said arm providing a linkage which changes said angle of said arm relative to the seat back, thereby adjusting said arm.

2. An angularly adjustable and pivotable seat arm for a reclinable vehicle seat having a seat back pivotable relative to a seat base comprising:

an arm having a length and locatable at an angle relative to the seat back;

said arm having a first end and a second end, with a pivot near the second end, said second end being connectable to the seat back at said pivot;

a control rod being pivotally mounted to an anchor point near said second end and extending from said anchor point toward said first end, said anchor point being displaced from said pivot;

said control rod having a threaded portion engaged and pivotally disengaged by a correspondingly threaded portion of a locking member located at a distance from said anchor point;

said locking member being pivotally mounted to lock by engagement of its threaded portion with said threaded portion of said control rod, said locking member being biased against a stop on said control rod so said threads are urged into engagement and said threads are urged out of engagement upon displacement of a lever;

said locking member operative on said control rod to change said distance from said locking member to said anchor point, thereby angularly adjusting said arm;

said angle changing as a function of the displacement of said anchor point from said pivot and the relative difference between said distance from said locking member to said anchor point and said length of said arm.

3. The invention according to claim 2 and said rod being pivotally connected at said anchor point with a control rod pin and extending therefrom through a spring plate to an opposite end.

4. The invention according to claim 3 and said locking member threaded portion communicating with an unthreaded portion;

said locking member threaded portion having a first longitudinal axis and said locking member unthreaded portion having a second longitudinal axis;

said control rod having a rod axis;

said first axis and said second axis being displaced from one another by about eight degrees, so that when said locking member is pivoted to disengage from said threaded portion of said rod, said rod axis becomes substantially parallel with said second axis so to accomplish said disengagement.

5. An angularly adjustable arm for a structure having a pivotable member pivotable relative to a base comprising:

an arm having a length and locatable at an angle relative to the pivotable member;

said arm having a first end and a second end, with a pivot near the second end, said second end being connectable to the pivotable member at said pivot;

a control rod being pivotally mounted to an anchor point near said second end and extending toward said first end, said anchor point being displaced from said pivot;

said control rod having a threaded portion engaged and pivotally disengaged by a correspondingly threaded portion of a locking member located at a distance from said anchor point;

said control rod being pivotally connected at said anchor point with a control rod pin and extending therefrom through a spring plate to an opposite end;

said locking member operative on said control rod to change said distance from said locking member to said anchor point, the angle between said arm and the pivotable member changing as a function of the displacement of said anchor point from said pivot and the relative difference between said distance from said locking member to said anchor point and said length of said arm.

6. The invention according to claim 5 and said locking member being pivotally mounted to lock by engagement of its threaded portion with the threaded portion of the control rod, said locking member being biased against said spring plate so said threads are urged into engagement and are movable out of engagement upon displacement of a lever.

7. The invention according to claim 5 and said correspondingly threaded portion of said locking member communicating with an unthreaded portion;

said correspondingly threaded portion of said locking member having a first longitudinal axis and said locking member unthreaded portion having a second longitudinal axis;

said control rod having a rod axis;

said first axis and said second axis being displaced from one another about eight degrees, so that when said locking member is pivoted to disengage from said threaded portion of said control rod, said rod axis becomes substantially parallel with said second axis to accomplish said disengagement.

8. An angularly adjustable arm for a structure having a pivotable member pivotable relative to a base comprising:

an arm having a length and locatable at an angle relative to the pivotable member;

said arm having a first end and a second end, with a pivot near the second end, said second end being connectable to the pivotable member at said pivot;

a control rod being pivotally mounted to an anchor point near said second end and extending toward said first end, said anchor point being displaced from said pivot;

said control rod having a threaded portion engaged and pivotally disengaged by a correspondingly threaded portion of a locking member located at a distance from said anchor point;

said locking member being pivotally mounted to lock by engagement of its threaded portion with said threaded portion of said control rod, said locking member being biased against a spring plate so said threads are urged into engagement and are movable out of engagement upon displacement of a lever;

said locking member operative on said control rod to change said distance from said locking member to said anchor point, the angle between said arm and the pivotable member changing as a function of the displacement of said anchor point from said pivot and the relative difference between said distance from said locking member to said anchor point and said length of said arm.

9. The invention according to claim 8 and said control rod being pivotally connected at said anchor point with a control rod pin and extending therefrom through said spring plate to an opposite end.

10. The invention according to claim 8 and said correspondingly threaded portion of said locking member communicating with an unthreaded portion;

said correspondingly threaded portion of said locking member having a first longitudinal axis and said locking member unthreaded portion having a second longitudinal said control rod having a rod axis;

said first axis and said second axis being displaced from one another about eight degrees, so that when said locking member is pivoted to disengage from said threaded portion of said control rod, said rod axis becomes substantially parallel with said second axis to accomplish said disengagement.

11. An angularly adjustable arm for a structure having a pivotable member pivotable relative to a base comprising:

an arm having a length and locatable an angle relative to the pivotable member;

said arm having a first end and a second end, with a pivot near the second end, said second end being connectable to the pivotable member at said pivot;

a control rod being pivotally mounted to an anchor point near said second end and extending toward said first end, said anchor point being displaced from said pivot;

said control rod having a threaded portion engaged and pivotally disengaged by a correspondingly threaded portion of a locking member located at a distance from said anchor point;

said correspondingly threaded portion of said locking member communicating with an unthreaded portion;

said correspondingly threaded portion of said locking member having a first longitudinal axis and said locking member unthreaded portion having a second longitudinal axis;

said control rod having a rod axis;

said first axis and said second axis being displaced from one another by about eight degrees, so that when said locking member is pivoted to disengage from said threaded portion of said rod, said rod axis becomes substantially parallel with said second axis to accomplish said disengagement.

said locking member operative on said control rod to change said distance from said locking member to said anchor point, the angle between said arm and the pivotable member changing as a function of the displacement of said anchor point from said pivot and the relative difference between said distance from said locking member to said anchor point and said length of said arm.

12. The invention according to claim 11 and said control rod being pivotally connected at said anchor point with a control rod pin and extending therefrom through a spring plate to an opposite end.

13. The invention according to claim 11 and said locking member being pivotally mounted to lock by engagement of its threaded portion with said threaded portion of said control rod, said locking member being biased against a spring plate so said threads are urged into engagement and are movable out of engagement upon displacement of a lever.

* * * * *